United States Patent
Kraus

(10) Patent No.: US 7,823,372 B1
(45) Date of Patent: Nov. 2, 2010

(54) SKEWED ROLLER CONVEYOR FOR DOUBLE WINDROW ATTACHMENT

(75) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/488,609

(22) Filed: Jun. 22, 2009

(51) Int. Cl.
*A01D 43/00* (2006.01)
*A01D 57/00* (2006.01)

(52) U.S. Cl. ........................................ 56/192

(58) Field of Classification Search ............. 56/192, 56/16.4 R, 16.4 A, 228, 218, 189, DIG. 7, 56/DIG. 21

See application file for complete search history.

(56) References Cited

U.S. PATENT DOCUMENTS

| | | | | |
|---|---|---|---|---|
| 3,691,941 A * | 9/1972 | Molitorisz | .................... | 100/89 |
| 3,714,766 A * | 2/1973 | Ender et al. | .................... | 56/364 |
| 5,031,393 A * | 7/1991 | Rostoucher | ................. | 56/154 |
| 5,094,063 A * | 3/1992 | Wattron et al. | .................... | 56/6 |
| 5,107,663 A * | 4/1992 | Wattron et al. | ............... | 56/15.7 |
| 6,612,102 B2 | 9/2003 | Walch et al. | | |
| 6,679,038 B2 | 1/2004 | Walch et al. | | |
| 6,832,467 B2 * | 12/2004 | Franet et al. | .................. | 56/192 |
| 2001/0045087 A1 * | 11/2001 | Franet et al. | ................. | 56/192 |

* cited by examiner

*Primary Examiner*—Árpád Fábián-Kovács

(57) ABSTRACT

A mower-conditioner is equipped with a double windrow attachment comprising a longitudinal conveyor which receives crop delivered rearwardly by a rotary conditioner. A side conveyor is located rearward of the longitudinal conveyor and is mounted for movement between a lowered operating position, wherein it is positioned for receiving crop conveyed rearwardly by the longitudinal conveyor, and a raised inoperative position wherein it permits the rearwardly conveyed crop to freely fall to the ground. The longitudinal conveyor is a roller conveyor with the rollers axes in a first embodiment comprising three sets of right- and left-hand rollers with the rollers of each set being skewed relative to a line extending perpendicular to a forward direction of the mower conditioner such that the axes of each set of rollers diverge rearwardly. In a second embodiment the rollers of each set are skewed such that their axes diverge forwardly. In a third embodiment, three rollers which extend the full width of the longitudinally conveyor are provided and are skewed so that crop is conveyed toward the left side of the mower-conditioner.

7 Claims, 5 Drawing Sheets

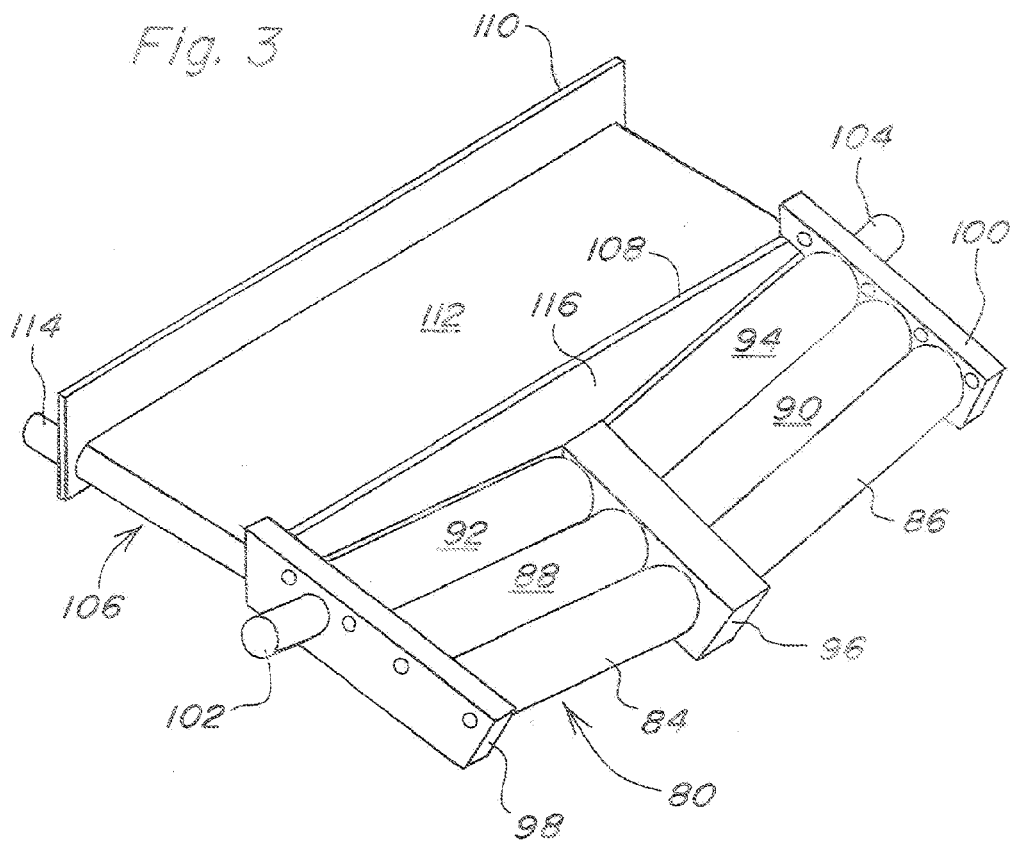

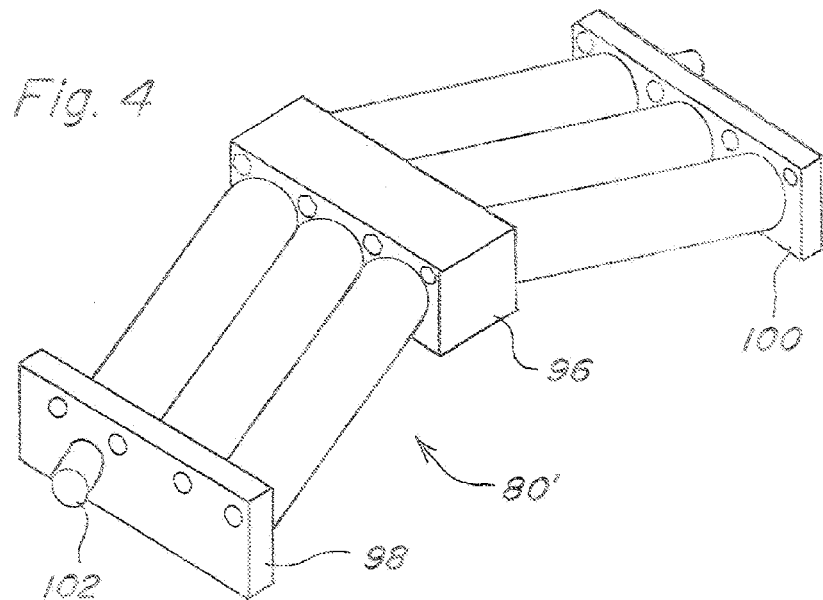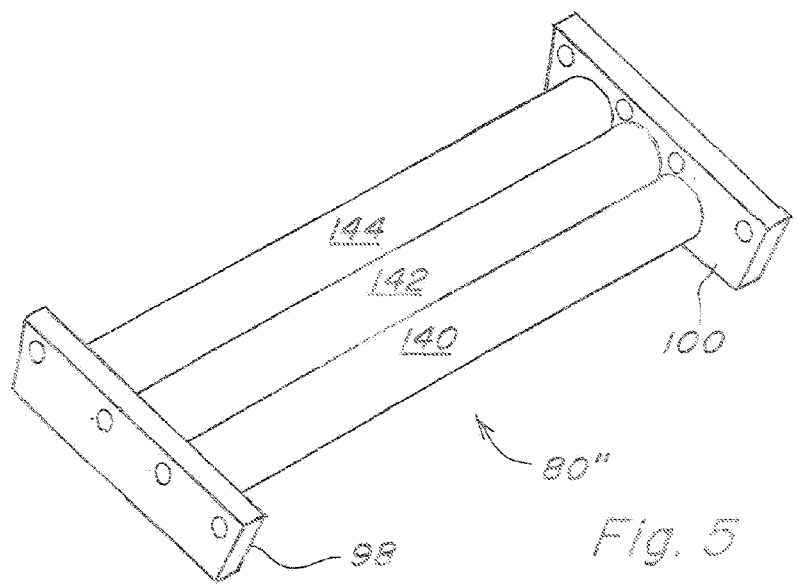

SKEWED ROLLER CONVEYOR FOR DOUBLE WINDROW ATTACHMENT

FIELD OF THE INVENTION

The present invention relates to mower-conditioners equipped with a double-windrow attachment, and, more particularly relates to a roller conveyor for receiving crop from a conditioner arrangement and delivering it to a double-windrow attachment.

BACKGROUND OF THE INVENTION

The problem with many current mower-conditioners equipped with double-windrow attachments is that the distance between the conditioner arrangement and the cross conveyor of the double windrow attachment is so far that some of the crop falls short of reaching the double-windrow attachment resulting in significant crop losses.

One design developed in an attempt to overcome the aforementioned problem is disclosed in U.S. Pat. Nos. 6,612,102 and 6,679,038, which each disclose a mower-conditioner equipped with a double-windrow attachment in the form of a side conveyor to which crop is delivered from a longitudinal conveyor disclosed as being a roller conveyor that receives crop from a conditioner arrangement. The rollers of this roller conveyor are disposed substantially perpendicular to the direction of travel and have the drawback that this roller conveyor does not have to ability to converge or spread the crop, as may be desired when the conveyor of the double-windrow attachment is moved to an inactive position wherein it permits crop conveyed by the roller conveyor to drop onto the ground.

The problem to be solved then is that of providing a mower-conditioner, which is equipped with a double-windrow attachment and longitudinal conveyor for transporting crop to the cross conveyor of the attachment when the cross conveyor is in an operating position, but which converges or disperses crop when the cross conveyor is in an inactive position.

SUMMARY OF THE INVENTION

According to the invention, there is provided a mower-conditioner equipped with a double-windrow attachment and an improved longitudinal conveyor for conveying crop between the crop conditioner arrangement and the cross conveyor of the double-windrow attachment.

An object of the invention is to provide a longitudinal conveyor having the ability to perform at least one of the functions of converging or spreading crop material delivered to the longitudinal conveyor by the crop conditioner arrangement.

The foregoing object is performed by providing a roller conveyor comprising at least one set of right- and left-hand rollers mounted for rotation about respective skewed axes which either diverge or converge towards the rear.

This and other objects of the invention will become apparent from a reading of the ensuing description together with the appended drawings.

BRIEF DESCRIPTION OF THE DRAWINGS

FIG. 3 is a schematic, right front perspective view of the longitudinal and side conveyors shown in FIGS. 1 and 2.

FIG. 4 is a right front perspective view of an alternate second embodiment of the longitudinal conveyor wherein right- and left-hand sets of rollers are skewed so that their axes converge towards the rear.

FIG. 5 is a right front perspective view of an alternate third embodiment of the longitudinal conveyor which includes three rollers extending a full width of the longitudinal conveyor.

DESCRIPTION OF THE PREFERRED EMBODIMENT

Figure 1:
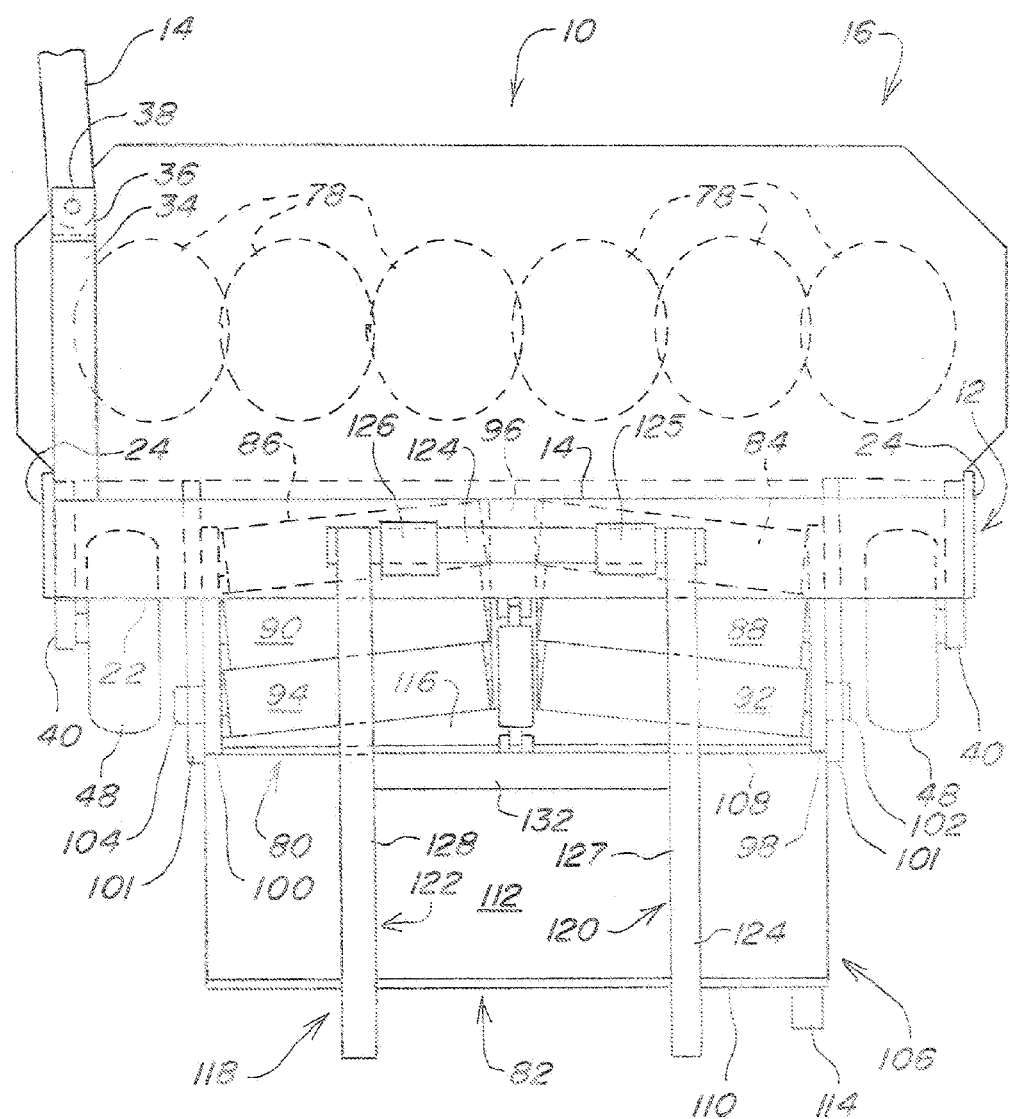
FIG. 1 is a schematic top view of a mower-conditioner equipped with a double-windrow attachment including a longitudinal conveyor and a side conveyor, with the side conveyor being shown in a lowered working position.
Figure 2:
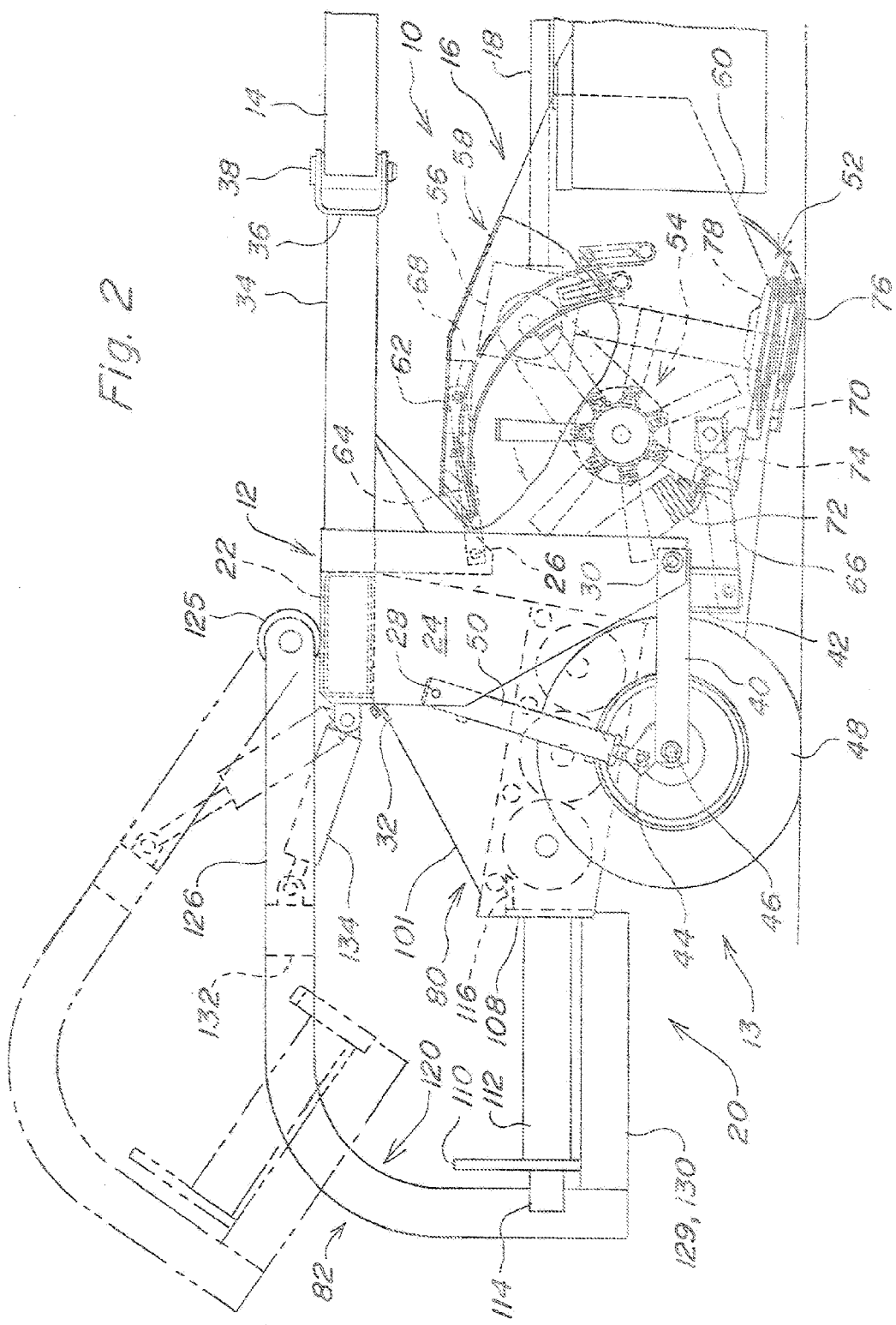
FIG. 2 is a left side view of the mower-conditioner FIG. 1, but showing the left ground wheel, the left wheel support and the left roller support housing removed, and adding a raised inactive position of the side conveyor in dashed lines.

Referring now to FIGS. 1 and 2, there is shown an impeller mower-conditioner 10 including a main frame 12, a pair of wheel assemblies 13 for supporting the frame for travel over the ground, a forward extending tongue 14 for hitching to a towing vehicle such as an agricultural tractor (not shown), a header assembly 16 carried by the main frame 12, a power take-off drive assembly 18 for transmitting power from the towing vehicle to the header, and a double or dual windrow assembly 20 carried by the main frame for receiving crop material from the header assembly 16.

The main frame 12 includes a horizontal transverse beam 22 having opposite ends joined to vertically legs 24. In each vertical leg 24 there are three transverse pivot points, namely, front upper 26, rear upper 28 and lower 30.

A spring anchor bracket 32 extends rearwardly and downwardly adjacent the rearward side of each of the junctions between the transverse beam 22 and legs 24. Extending forwardly from the left-hand end of the transverse beam 20 is a tongue support member 34 defined by a tubular frame member of rectangular cross section, closed at its forward end by a clevis-like member 36. A rear end of the tongue 14 is received in, and pivotally coupled to, the clevis-like member 36 by a vertical pivot pin 38. A hydraulic cylinder, not shown, is coupled between the tongue 14 and support member 34 and serves to pivot the tongue 14 horizontally relative to the support member 34 and in that way adjusts the path followed by the impeller mower-conditioner 10 relative to that of the towing tractor.

Each wheel assembly 13 includes a fore-and-aft extending wheel support arm 40 having its forward end attached at the pivot point 30 in the associated vertical leg 24. Fixed to a lower side of each wheel support arm 40 at a location adjacent the pivot point 30 is a downwardly extending lower float link pivot bracket 42 and, extending upwards adjacent a rear end of each arm 40 is a hydraulic cylinder bracket 44. A transversely extending wheel spindle 46 is rigidly attached at a rear regions of each of the wheel support arms 40 and carries a wheel 48. A hydraulic cylinder 50 is connected at its ends between each rear upper pivot point 28 of the frame legs 24, and each cylinder pivot bracket 44 and can be selectively actuated for raising and lowering the header assembly 16 between operating and transport positions.

The header assembly 16 is floatingly supported from the main frame 10 and includes frame members (not shown) supporting component assemblies including a rotary cutter bar assembly 52, a conditioning rotor assembly 54, a gear box 56 and a hood 58. The hood 58 includes opposite, fore-and-aft extending side sheets 60 joined to a top portion 62, with the side sheets being in fore-and-aft alignment with the vertical frame legs 24. The header assembly 16 is carried by opposite pairs of approximately parallel upper and lower float links 64 and 66, respectively. The float links are pivotally connected at their respective forward ends to opposite pairs of upper and lower support plates 68 and 70, respectively fixed to upper and lower regions of the hood side sheets 60. The rearward ends of the upper float links 64 are pivotally supported at the opposite header support pivot points 26 of the main frame legs 24, respectively, and the lower links 66 have their rear ends pivotally attached to the brackets 42 carried by the pair of wheel support arms 40. The links 64 and 66 are nearly horizontal when the header assembly 16 is in a working position, as shown in FIG. 2.

The header assembly 16 is biased upwards by a pair of opposite float springs 72, each spring being a coil tension spring having a lower end hooked to a respective one of a pair of opposite spring brackets 74 attached to one of the hood side sheets 60, and having its upper end coupled to an associated one of the spring brackets 32.

The rotary cutter bar assembly 52 is supported by the frame (not shown) of the header assembly 16 and extends transversely between the opposite side sheets 60 of the hood 58 and close to the lower edges of the sheets 60 and ahead of the lower float links 66. The cutter bar assembly 52 includes an elongated beam 76 in which the driven shafts of six equally spaced, side-by-side disk cutter units 78 are mounted for rotation about axes extending perpendicular to the beam 76.

The conditioning rotor assembly 54 extends transversely across the header assembly 16 at a location behind and above the cutter bar assembly 52. Opposite ends of the rotor assembly are respectively defined by axially aligned stub shafts which are journaled in bearings (not shown) carried by the header frame (not shown).

The double or dual windrow assembly 20 includes a longitudinal conveyor assembly 80 and a side conveyor assembly 82. Referring now also to FIG. 3, it can be seen that the longitudinal conveyor assembly 80 is in the form of a roller conveyor having a width commensurate with the width of the conditioning rotor assembly 54 and located rearwardly of the rotor assembly so as to be in a position for receiving conditioned crop discharged to the rear by the rotor assembly 54. The longitudinal conveyor assembly 80 comprises three sets of right- and left-hand rollers, namely a leading set of rollers 84 and 86, a middle set of rollers 88 and 90 and a trailing set of rollers 92 and 94. The rollers of each set of rollers is skewed relative to a horizontal line extending perpendicular to a forward direction of travel such that their respective axes of rotation diverge towards the rear. While all of the roller axes are here shown as being co-planar, inner ends of each set of rollers could be arranged so as to be lower than outer ends so that the conveyor assembly defines a shallow trough. The inner ends of the rollers include respective stub shafts mounted for rotation within a middle housing 96, with outer ends of the right-hand rollers 84, 88 and 92 being defined by stub shafts (not shown) mounted for rotation within a right-hand housing 98, and with outer ends of the left hand rollers 84, 88 and 92 including respective stub shafts mounted for rotation within a left-hand housing 100. Located inwardly of the vertical legs 24 of the main frame 12 and having upper ends fixed to the cross beam 22 are vertical conveyor mounting plates 101 that are bolted to upper locations of the housings 98 and 100. A linkage arrangement (not shown) is coupled between the middle housing 96 and the cross beam 22.

A pair of hydraulic motors 102 and 104 are respectively coupled for causing rotation of the rear set of rollers 92 and 94 so as to deliver crop rearwardly, with appropriate drive assemblies (not shown) being respectively located within the right- and left-hand housings 98 and 100 for causing the right-hand rollers 84 and 88 to be rotated to cause crop to be delivered rearwardly to the right hand roller 92, and for causing the left-hand rollers 86 and 90 to be rotated to cause crop to be delivered rearwardly to the roller 94.

Forming part of the side conveyor assembly 82 and being mounted so as to be located immediately to the rear of the rear set of rollers 92 and 94 for receiving crop delivered rearwardly by the rollers is a belt conveyor 106 comprising longitudinally spaced, front and rear upright side plates 108 and 110, in which opposite ends of a plurality of longitudinally extending belt-support rollers (not shown) are mounted for rotation. Right- and left-hand end rollers of the belt-support rollers have an endless belt 112 looped about them, with the right-hand roller being coupled to a hydraulic motor 114 which is selectively operable for causing the belt to be driven for delivering crop either to the right or to the left of the implement 10. It is to be noted that the rear side plate 110 extends above the belt 112 by a distance greater than does the front side plate 108 so as to prevent crop from moving rearwardly off the conveyor belt 112. Also provided for preventing the loss of crop is a filler plate 116 that fills the gap between the rear set of longitudinal conveyor rolls 92 and 94 and the front side plate 108 of the belt conveyor 106.

The side conveyor assembly 82 further includes a mounting frame 118 including transversely spaced, right- and left-hand legs 120 and 122, respectively, which have forward ends joined to opposite end regions of a transversely extending, horizontal support tube 124 mounted for rotation within transversely spaced right and left bearing assemblies 125 and 126 that are fixed to a central region between opposite ends of the main frame cross beam 22. As considered when the side conveyor assembly 82 is in its working position shown in FIGS. 1 and 2, the legs 120, 122 include respective generally L-shaped portions 127 and 128 which extend first horizontally from the support tube 124 and then are curved rearwardly and downwardly to a point below the level of the belt conveyor 112 where they are respectively joined to horizontal leg portions 129 and 130 which are fixed to bottom edges of the conveyor side plates 108 and 110. A cross member 132 extends between and has opposite ends joined to the leg portions 124 and 126. Provided for moving the side conveyor assembly between a lowered working position, shown in solid lines in FIG. 2, and a raised inoperative position, shown in dashed lines in FIG. 2, is an extensible and retractable hydraulic actuator 134 that is coupled between a front side of the conveyor mounting frame cross member 132 and a rear side of the implement main frame cross beam 22.

As thus described, the embodiment of the invention disclosed in FIGS. 1-3 operates to selectively combine windrows of crop or to converge crop to form a windrow on the ground without requiring forming shields. Specifically, when it is desired to convey a swath of cut and conditioned crop to the side for either placing it beside or on top of a previously formed windrow of crop, the hydraulic actuator 134 is contracted, as shown in FIGS. 1 and 2, thereby positioning the side conveyor 82 in its working position wherein the conveyor belt 112 is disposed just to the rear of the longitudinal conveyor 82 and has its sets of rollers driven by the motors 102 and 104 so as to convey cut and conditioned crop, received from the rotary conditioner 54, to the rear where it is delivered to the belt conveyor 106, which in turn, delivers the crop to the side in accordance with the motion imparted to the belt 112 by the conveyor drive motor 114.

Then, if it is desired to form a windrow of crop directly behind the implement 10 during the next cutting pass, the actuator 134 is extended so as to lift the conveyor 106 out of the path of the crop delivered by the sets of rollers of the longitudinal conveyor 80 so that the crop falls to the ground. Thus, due to the sets of rollers 84, 86 and 88, 90 and 92, 94 having their axes skewed to a horizontal line extending perpendicular to the direction of travel so as to diverge toward the rear, the sets of rollers act to convey the crop inwardly from their outer ends so that the crop from opposite sides of the longitudinal conveyor 80 is moved toward the middle so as to form a windrow when the crop is deposited on the ground.

Referring now to FIG. 4, there is shown a longitudinal conveyor 80' which is a first alternate embodiment which differs from that shown in FIG. 3 in that instead of diverging toward the rear, the axes of the sets of right- and left-hand rollers 84,86; 88,90 and 92, 94 converge toward the rear. With this arrangement, cut and conditioned crop can be spread as it is conveyed so that cut and conditioned crop can be deposited in a swath having a width commensurate with that of the width of the conveyor 80' when the side conveyor assembly 82 is placed in its raised, inoperative position.

Referring now to FIG. 5, there is shown a longitudinal conveyor 80" which is a second alternate embodiment which differs from those shown in FIGS. 3 and 4 in that its roller arrangement includes leading, middle, and trailing rollers 140, 142, and 144, respectively, with the conveyor 80" being adapted for being mounted either with the left-hand end in leading relationship to the right-hand end, in which case crop received by the conveyor 80" is conveyed to the right, or with the right-hand end in leading relationship to the left-hand end, in which case crop received by the conveyor 80" is conveyed to the left. In both cases, the axes of the rollers 140, 142 and 144 are skewed between approximately 8-15° relative to a horizontal line extending perpendicular to the forward direction of travel.

Figure 6:
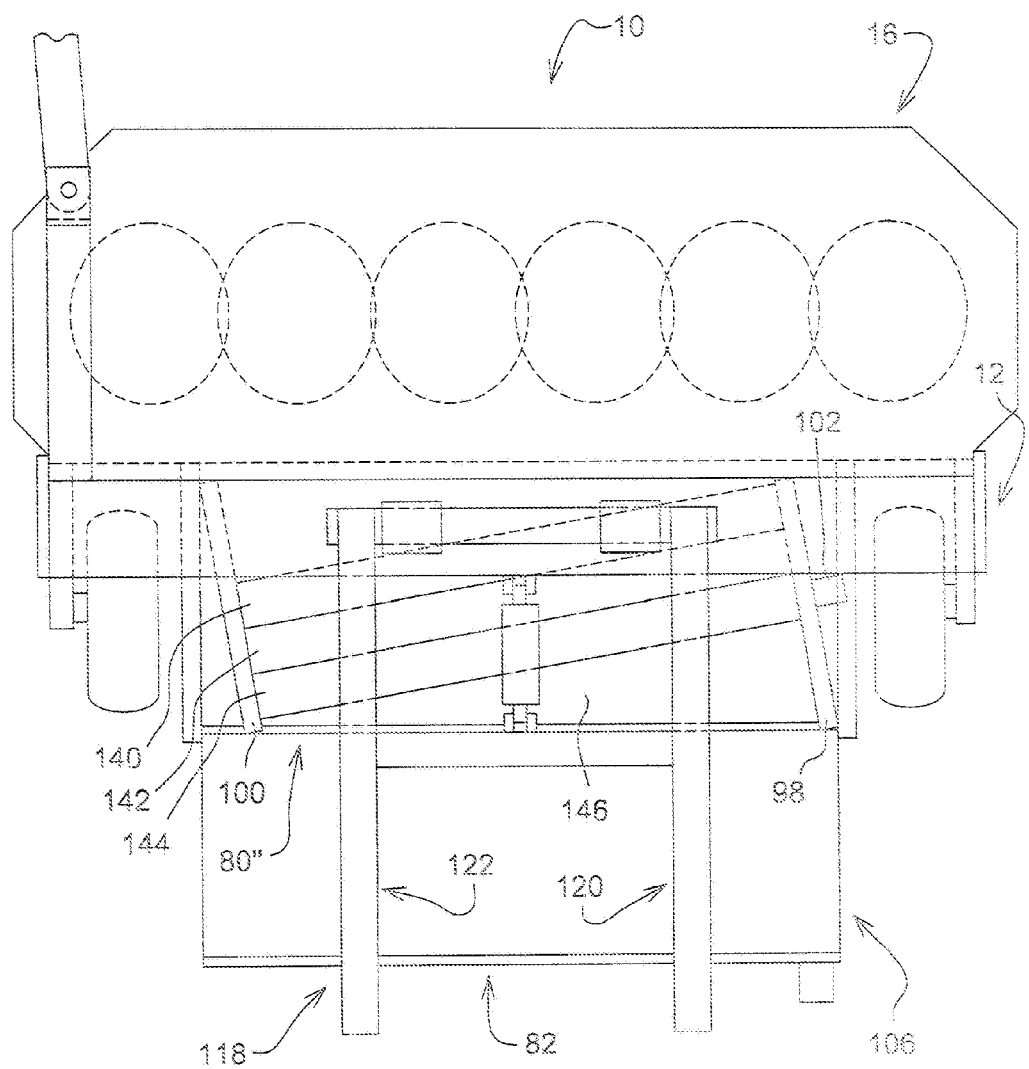
FIG. 6 is a top view like that of FIG. 1, but showing the longitudinal conveyor embodiment of FIG. 5.

Referring now to FIG. 6, there is shown the impeller mower-conditioner 10 embodying the longitudinal conveyor 80" in lieu of the longitudinal conveyor 80, with only a limited number of reference numerals and with it to be understood that except for the conveyor 80", the mower-conditioner 10 corresponds to that shown in FIGS. 1 and 2. It can be seen that the longitudinal conveyor 80" is shown mounted with the right-hand end leading the left-hand end so as to be skewed relative to a line extending perpendicular to a forward direction of travel. A filler plate 146 is provided to fill the gap between the rear side of the longitudinal conveyor 80" and the front side of the side conveyor 82. With the longitudinal conveyor 80" being oriented as shown, crop cut by the header 16 is delivered to the top of the longitudinal conveyor 80" and is conveyed toward the left end of the conveyor 80" by the rolls 140, 142 and 144, which are driven by the hydraulic motor 102 such that the tops of the rolls travel towards the rear. It will be understood that the conveyor 80" may be mounted with the left-hand end leading the right-hand end, in which case crop will be conveyed toward the right.

Having described the preferred embodiment, it will become apparent that various modifications can be made without departing from the scope of the invention as defined in the accompanying claims.

The invention claimed is:

1. In a combination of a mower having a main frame including a horizontal cross beam having opposite ends joined to depending legs to which wheel assemblies are attached to support the main frame for travel across the ground in a forward direction of travel, with the main frame supporting a mowing assembly forwardly of the cross beam in an orientation for cutting crop and moving the cut crop rearwardly along a path extending parallel to said forward direction of travel at a level above the ground and a double windrow attachment including a longitudinal conveyor attached to the main frame in a position for receiving cut crop from the mowing assembly and for moving the cut crop rearwardly, and including a side conveyor attached to the main frame and being mounted for movement between an operative position for receiving crop delivered rearwardly by the longitudinal conveyor, and an inoperative position, for permitting crop to fall freely to the ground, the improvement comprising: said longitudinal conveyor being a roller conveyor including a roller arrangement including at least one roller having an axis skewed relative to a horizontal line extending perpendicular to said forward direction of travel of the mower, with said at least one roller having a leading end and a trailing end, as considered relative to said forward direction of travel, so that crop engaging said at least one roller is conveyed laterally along said at least one roller in a direction from said leading end toward said trailing end.

2. The combination, as defined in claim 1, wherein said roller arrangement comprises at least one set of right- and left-hand rollers having respective axes being arranged so as to be one of either divergent or convergent rearwardly.

3. The combination, as defined in claim 2, wherein said roller arrangement comprises at least two sets of right- and left-hand rollers, with each set of rollers including respective axes being arranged so as to be one of either divergent or convergent rearwardly.

4. The combination, as defined in claim 2, wherein said roller arrangement comprises at least three sets of right- and left-hand rollers, with each set of rollers including respective axes which are disposed so as to be one of either divergent or convergent rearwardly.

5. The combination, as defined in claim 1, wherein said at least one roller extends substantially an entire distance between opposite sides of the roller conveyor.

6. The combination, as defined in claim 1, wherein said roller arrangement includes at least three rollers which extend substantially an entire distance between opposite sides of the roller conveyor.

7. The combination, as defined in claim 2, wherein a gap is defined between a rear side of said roller conveyor and a front side of said side-conveyor; and further including a transverse filler plate arrangement located in said gap between said roller conveyor and said side-conveyor and serving to prevent crop material from falling to the ground once it leaves the roller conveyor and to guide such crop to a conveying surface of said side conveyor.

* * * * *